United States Patent
Zapata et al.

[11] Patent Number: 5,971,565
[45] Date of Patent: Oct. 26, 1999

[54] LAMP SYSTEM WITH CONDITIONED WATER COOLANT AND DIFFUSE REFLECTOR OF POLYTETRAFLUORETHYLENE(PTFE)

[75] Inventors: Luis E. Zapata; Lloyd Hackel, both of Livermore, Calif.

[73] Assignee: Regents of the University of California, Oakland, Calif.

[21] Appl. No.: 08/546,029

[22] Filed: Oct. 20, 1995

[51] Int. Cl.⁶ .................................................. F21V 29/00
[52] U.S. Cl. ........................... 362/294; 362/218; 362/264
[58] Field of Search .............................. 362/96, 218, 264, 362/294, 346; 313/12, 17, 22, 35, 36, 116; 392/407, 416, 422, 423; 219/405, 411

[56] References Cited

U.S. PATENT DOCUMENTS 3,909,736  9/1975  Huchital et al. ........................ 330/4.3
5,004,541  4/1991  Noll et al. .............................. 210/251
5,285,310  2/1994  Miller et al. ............................ 359/338

FOREIGN PATENT DOCUMENTS 2311992  12/1976  France ................................... 362/294
184347   1/1967   U.S.S.R. ................................ 313/12

*Primary Examiner*—Y. My Quach
*Attorney, Agent, or Firm*—L. E. Carnahan; Henry P. Sartorio

[57] ABSTRACT

A lamp system with a very soft high-intensity output is provided over a large area by water cooling a long-arc lamp inside a diffuse reflector of polytetrafluorethylene (PTFE) and titanium dioxide ($TiO_2$) white pigment. The water is kept clean and pure by a one micron particulate filter and an activated charcoal/ultraviolet irradiation system that circulates and de-ionizes and biologically sterilizes the coolant water at all times, even when the long-arc lamp is off.

20 Claims, 4 Drawing Sheets

LAMP SYSTEM WITH CONDITIONED WATER COOLANT AND DIFFUSE REFLECTOR OF POLYTETRAFLUORETHYLENE(PTFE)

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to heating equipment and methods and more particularly to semiconductor wafer heating systems that use arc lamps for uniform surface heating in device fabrication.

2. Description of Related Art

There exists many prior art examples of processing equipment that use arc lamps to heat semiconductor wafers. For example, U.S. Pat. No. 5,446,825, issued Aug. 29, 1995, to Moslehi, et al., describes a high-performance multi-zone illuminator module (130) for directing light and heat onto a semiconductor wafer (60) in a device fabrication reactor to improve overall semiconductor wafer processing uniformity. A housing connected to the wafer processing reactor has a reflector mounted to the bottom side with a plurality of concentric circular zones (190, 192, 194 or 270, 262, 266, 264) for reflecting heat and light that include a plurality of circularly distributed lamp sockets (185). Within the lamp sockets (185) are point-source lamps (196) for directing light to the semiconductor wafer (60) surface. The point-source lamps (196) have reflectors (184 and 186 or 276 and 277) for directing light toward the wafer. The lamps within each circular zone provide a continuous and diffused light ring at the semiconductor wafer (60). The multiple circular lamp zones and the center zone can be controlled independently to allow real-time wafer temperature uniformity slip-free control for uniform device processing over a wide range of wafer temperatures.

U.S. Pat. No. 4,755,654, issued Jul. 5, 1988, to Crowley, et. al., describes a semiconductor wafer heating chamber that has an optical element between a light source and a wafer for redistributing the light from the light source. The optical element is constructed in such a manner as to produce the desired illumination (and thus heating) pattern on the semiconductor wafer from the light source. Preferably, the light source is a long-arc lamp mounted above a base plate of a heating chamber. A primary reflector is mounted above the long-arc lamp and is shaped to produce a substantially uniform light distribution on the base plate. A quartz window is mounted between the arc lamp and the base plate. The quartz window acts as a lens to redistribute the light from the lamp and the reflector on a wafer. The window can be constructed as a diffraction grating with a series of lines formed by etching into the window or depositing material on the window to produce a diffraction pattern which gives the desired illumination pattern on the wafer. Interchangeable quartz windows are used to produce different illumination patterns which are appropriate for different size wafers and different types of heating processes.

U.S. Pat. No. 4,820,906 Apr. 11, 1989 Stultz, describes a long arc gas-discharge lamp for rapidly heating a semiconductor wafer. The spectral output of the lamp is specifically matched to the absorption characteristics of the particular semiconductor wafer being heated by choosing an appropriate gas or mixture of gases. The electrodes of the long arc lamp are separated by a distance greater than the largest dimension of the semiconductor wafer to insure that the entire wafer is illuminated at one time. In addition, the lamp has a high power density to raise the temperature of the semiconductor wafer to the required process temperature. Large diameter metal electrodes are used to conduct more heat from the ends of the lamp. The electrodes contain a low work function metal such as thorium oxide to increase the electron emission. The enclosing glass capillary has thin walls between the electrodes for improved heat dissipation. The glass capillary is cooled to carry the heat away from the lamp.

U.S. Pat. No. 4,630,182, issued Dec. 16, 1986, to Moroi, et. al., describes a system for generating a high-intensity light using a short arc lamp equipped with a cooling device capable of effectively cooling the arc lamp and the reflectors. The system comprises a high intensity lamp. A reflector is provided with a reflecting face that surrounds the lamp and further provided at an end with a window for transmitting the light from the reflecting face and at the other end with an aperture for passing a part of the lamp. A casing houses the reflector and the lamp and provides a ventilating hole to the exterior. An air guide connects the ventilating hole with an air path connecting the light transmitting window of the reflector with the aperture.

U.S. Pat. No. 5,446,824, issued Aug. 29, 1995, also to Moslehi, describes a chuck (82) for lamp-heated thermal and plasma semiconductor wafer (38) processing that comprises a surface (171) for absorbing heat and light from an illuminator module (84) that transforms the electrical energy into heat and light. Chuck (82) includes an absorbing surface (171) that absorbs heat and light and distributes the resultant thermal energy. From the absorbing surface, a contact surface (168) conducts the heat energy to semiconductor wafer (38) and uniformly heats the semiconductor wafer (38) over a large area with the distributed thermal energy. Chuck (82) not only provides significantly improved process temperature uniformity but also allows for the generation of RF plasma for plasma-enhanced fabrication processes as well as for in-place chamber cleaning and etching. Additionally, chuck (82) provides at least two methods of determining semiconductor wafer temperature: a direct reading thermocouple (112) and association with the pyrometry sensor of illuminator module (84). The chuck (82) is thermally decoupled from the thermal mass of fabrication reactor (50) for purging optical quartz window (80) surface and semiconductor wafer (38) backside in order to prevent deposition on wafer backside and the quartz window.

U.S. Pat. No. 4,461,670, issued Jul. 24, 1984, to Celler, et. al., describes dielectrically isolated regions of a single crystal silicon that are subjected to a melting process. A substrate with single crystal silicon regions contacting non-single crystal silicon regions that overlie a dielectric material are treated. In particular, the entire region(s) of non-single crystal silicon is melted using primarily radiant energy. Cooling is then initiated and the molten silicon is converted into a region of single crystal material. Isolation is completed by removing the appropriate regions of single crystal silicon.

SUMMARY OF THE INVENTION

An object of the present invention is to provide a lamp system for uniform heating of a target.

Another object of the present invention is to provide a method for using diffuse reflectors of relatively delicate materials in association with relatively hot arc lamps.

Briefly, a lamp system of the present invention with a spatially uniform high-intensity output is provided by water cooling a long-arc lamp inside a diffuse reflector of polytetrafluorethylene and titanium dioxide white pigment. The water is kept ultra-clean and pure by a one micron particulate filter, a de-ionizer, and an ultraviolet irradiation system that circulates and biologically sterilizes the coolant water at all times, even when the arc lamp is off.

An advantage of the present invention is that a lamp system is provided for operating at high lamp power levels with diffuse reflectors of polytetrafluorethylene.

Another advantage of the present invention is that a method is provided for constructing and operating a lamp system with a diffuse high intensity output over a large area.

Another advantage of the present invention is its ability to achieve higher temperatures and better temperature uniformity in the illuminated material over a larger area than before possible.

DETAILED DESCRIPTION OF THE INVENTION

Figure 1:
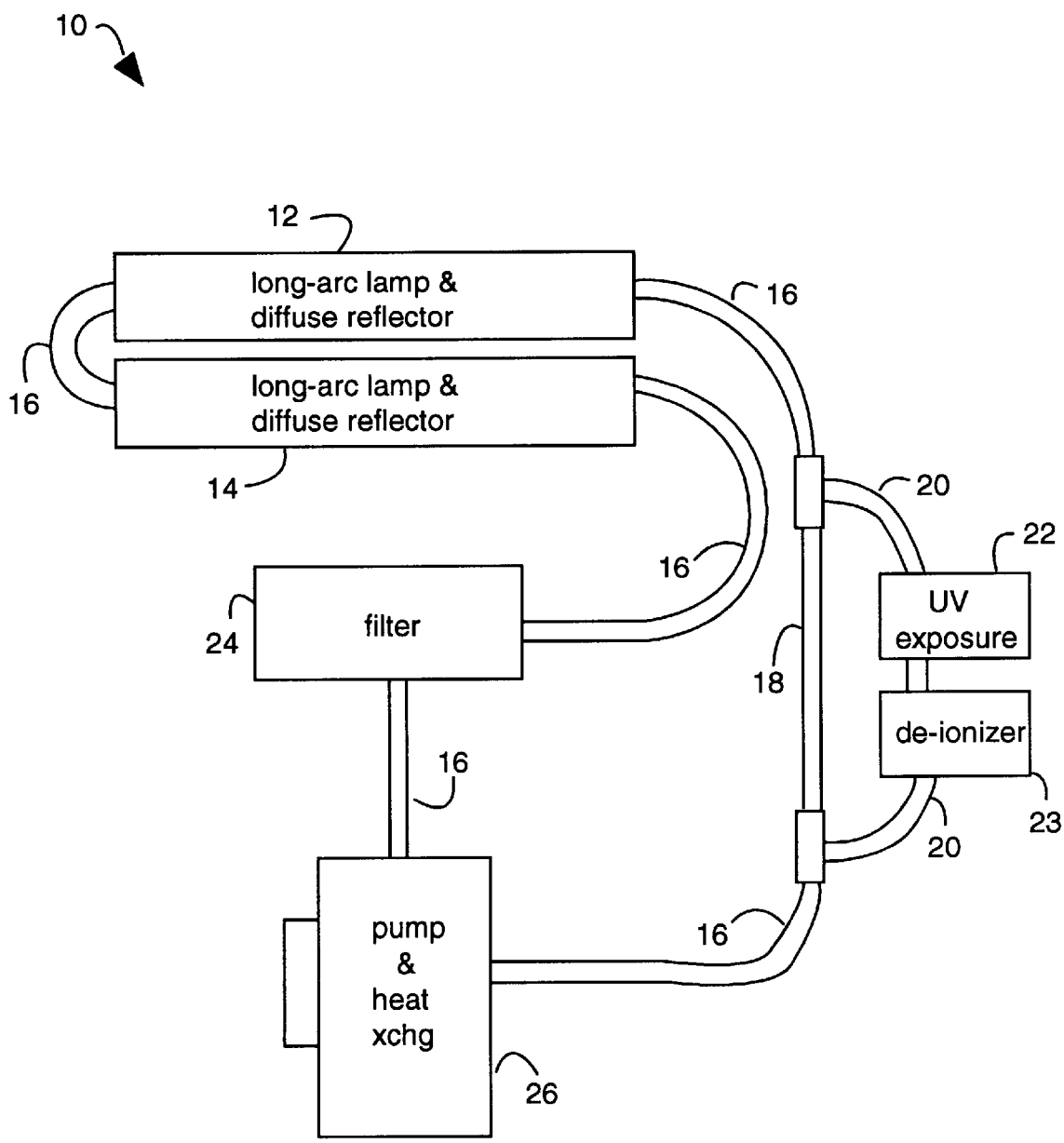
FIG. 1 is a functional block diagram of an arc lamp system embodiment of the present invention.

FIG. 1 illustrates an arc lamp system embodiment of the present invention, referred to herein by the general reference numeral 10. The system 10 comprises a pair of liquid-cooled long-arc lamp and diffuse reflector assemblies 12 and 14 for irradiating a work-in-progress passed between them. A piping system 16 carries a liquid coolant, e.g., ultrapure water, through the pair of liquid-cooled long-arc lamp and diffuse reflector assemblies 12 and 14. A bypass 18 pipe circumvents a majority of the liquid coolant flow from passing through a branch piping 20, a biological sterilizer assembly 22, and a de-ionizer 23. Activated charcoal is used as the main means for removing ions from the liquid coolant in the de-ionizer 23, e.g., to reduce the conductivity of the liquid coolant to less than twelve megohms per centimeter. Ultraviolet light is used as the main means for biologically cleansing the liquid coolant in the sterilizer assembly 22. However other well-known means can also be employed, such as nuclear radiation, chemical treatment, or boiling. A filter 24 cleans particles, e.g., as small as one micron, from the liquid coolant flow. A pump and heat exchange unit 26 provides the main pumping effort required during operation of the pair of liquid-cooled long-arc lamp and diffuse reflector assemblies 12 and 14, and it rids the system of excess heat, e.g., by an air-cooled radiator. When the pair of liquid-cooled long-arc lamp and diffuse reflector assemblies 12 and 14 are not operating, the de-ionizer/ultraviolet sterilizer assembly 22 provides a maintenance flow of the liquid coolant in the system 10. It further provides a constant de-ionization/sterilization of the liquid coolant that circulates through the branch piping 20 and ultimately throughout the piping system 16. Such maintenance of a minimum flow and de-ionization/sterilization is critical to prevent the development of floating or stationary spots between or on the long-arc lamps and their diffuse reflectors. Such spots, if present, can precipitate a light absorption resulting in a runaway heat buildup that can catastrophically ruin the delicate material of the diffuse reflectors. The hyperclean de-ionized water also percolates through the porous SPECTRALON continuously cooling and leaching away all conglomerates of ions that otherwise accumulate in the porous material and could cause burn damage.

Figure 2:
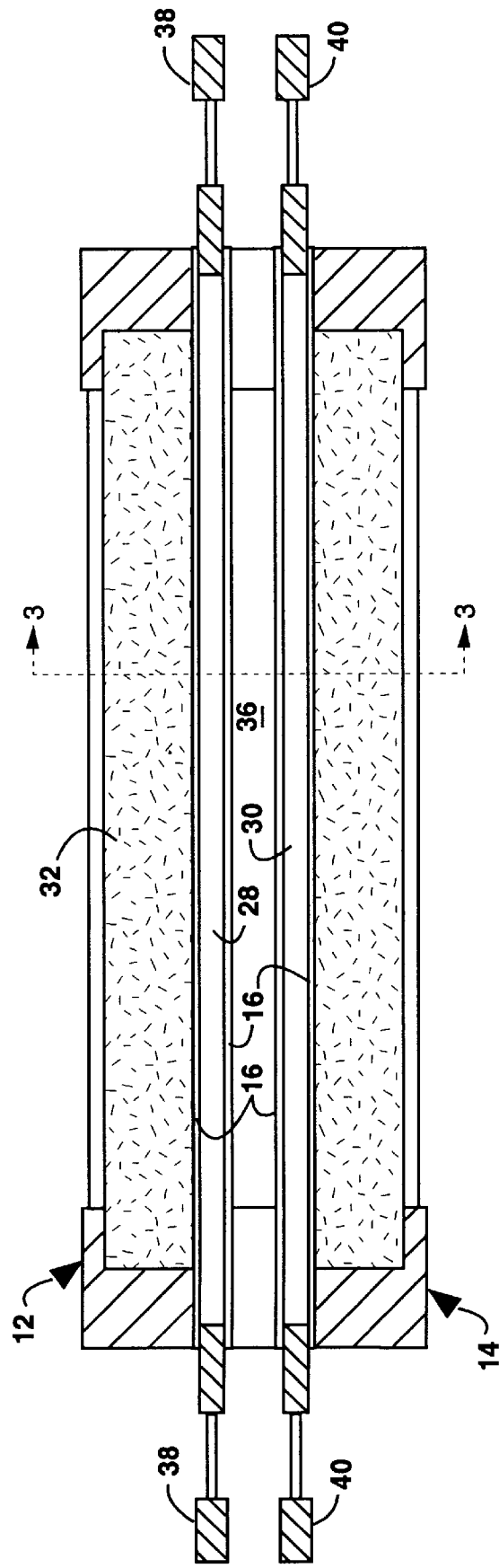
FIG. 2 is an axial cross-section of the arc lamp and diffuse reflector pair in the system of FIG. 1.
Figure 3:
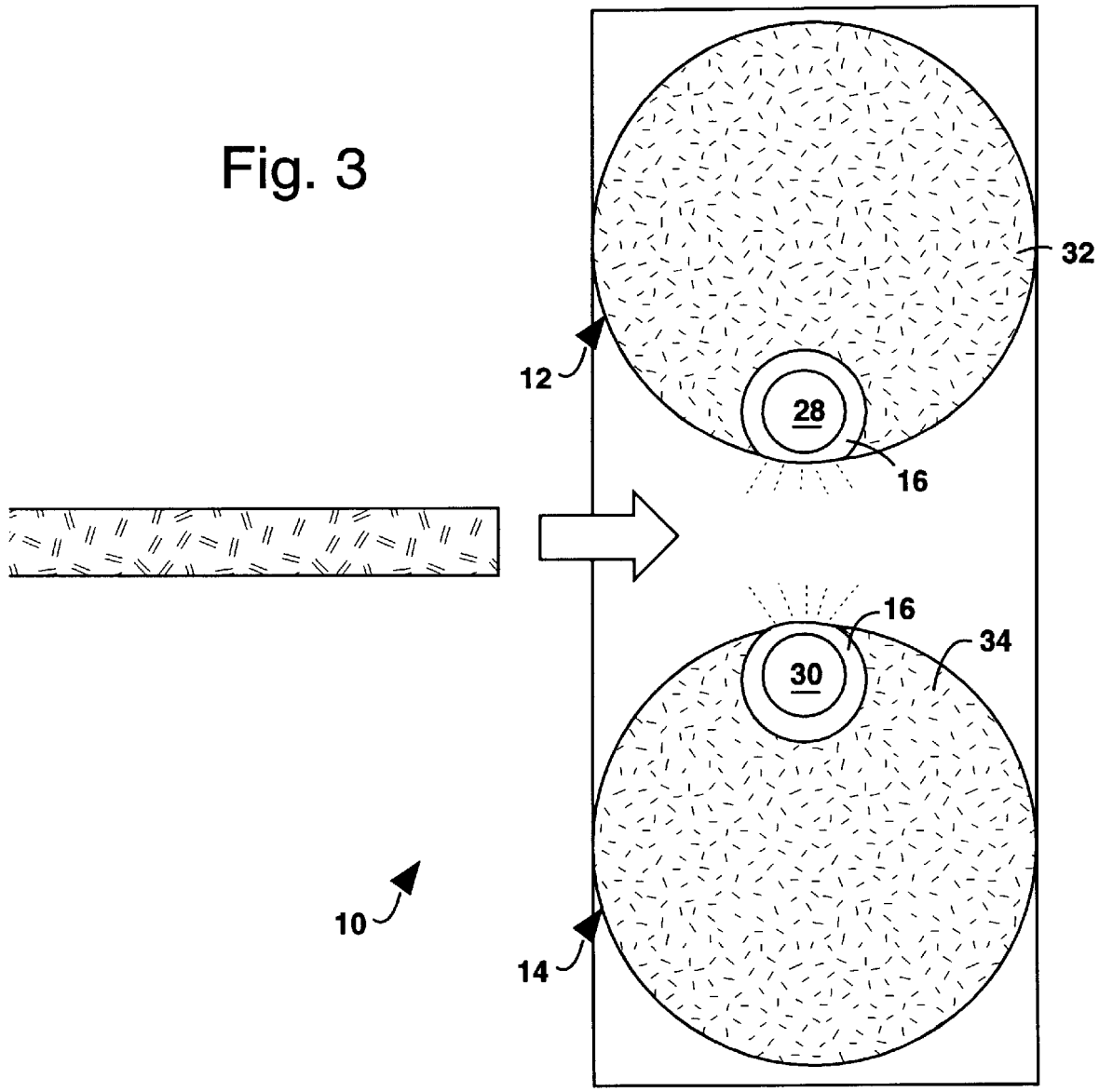
FIG. 3 is a transverse cross-section of the arc lamp and diffuse reflector pair taken along the line 3—3 in FIG. 2.

FIGS. 2 and 3 respectively illustrate an axial cross-section and a transverse cross-section of the pair of liquid-cooled long-arc lamp and diffuse reflector assemblies 12 and 14. A pair of long-arc lamps 28 and 30 having electrodes 38 and 40, respectively, at each end thereof, are respectively disposed top and bottom in parts of the piping system 16, e.g., in a pair of water jackets. A diffuse reflector 32 backs up the long-arc lamp 28 and a diffuse reflector 34 backs up the long-arc lamp 30. These are all configured to direct a soft uniform light and heat toward a rectangular gap area 36. Silicon wafers being processed, for example, are passed through the rectangular gap area 36 to be heated. The diffuse reflectors comprise a bulk material of polytetrafluorethylene (PTFE), preferably including a pigment of titanium dioxide, and having a reflectivity that exceeds 99%. Such material is commercially available from Labsphere Inc., North Sutton, N.H. and is sold under the trademark, SPECTRALON™.

Figure 4:
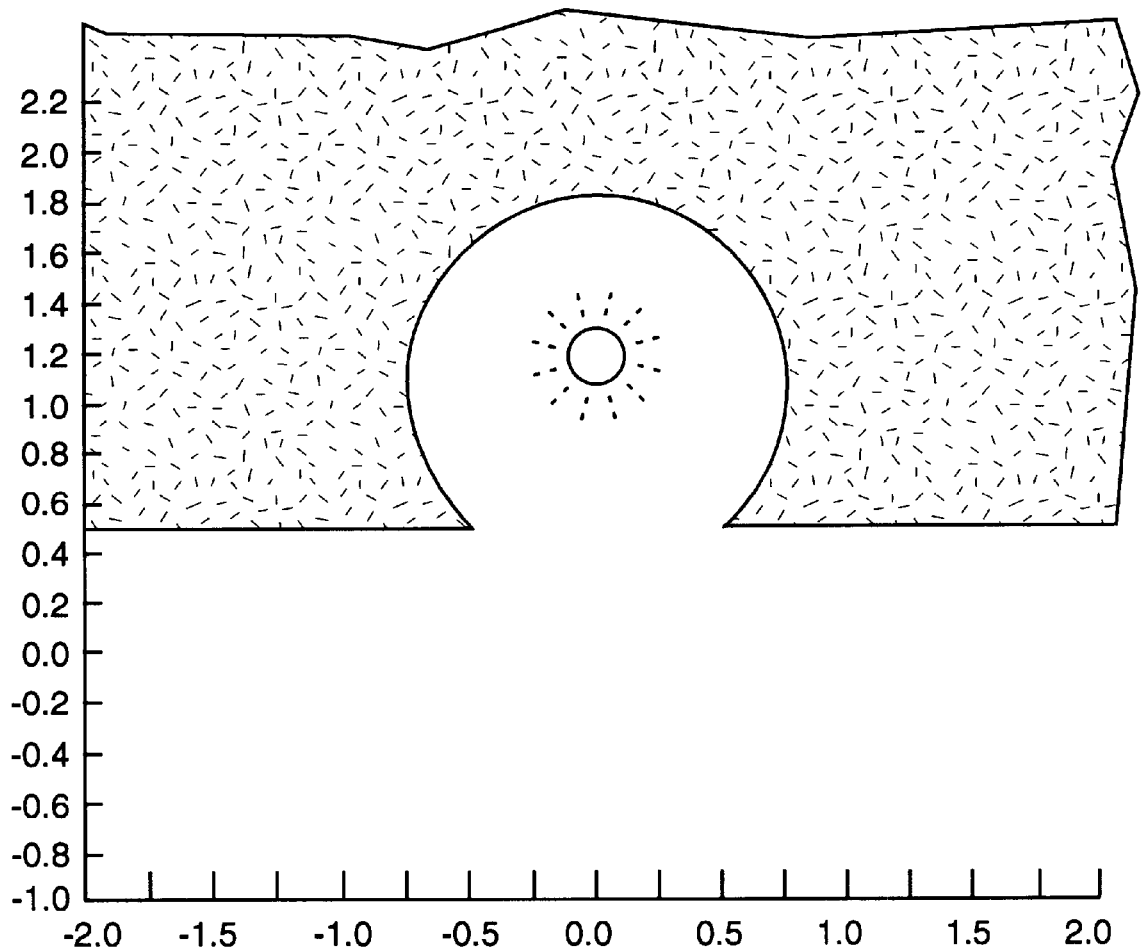
FIG. 4 is a computer model for a transverse cross section of one arc lamp and diffuse reflector.
Figure 5:
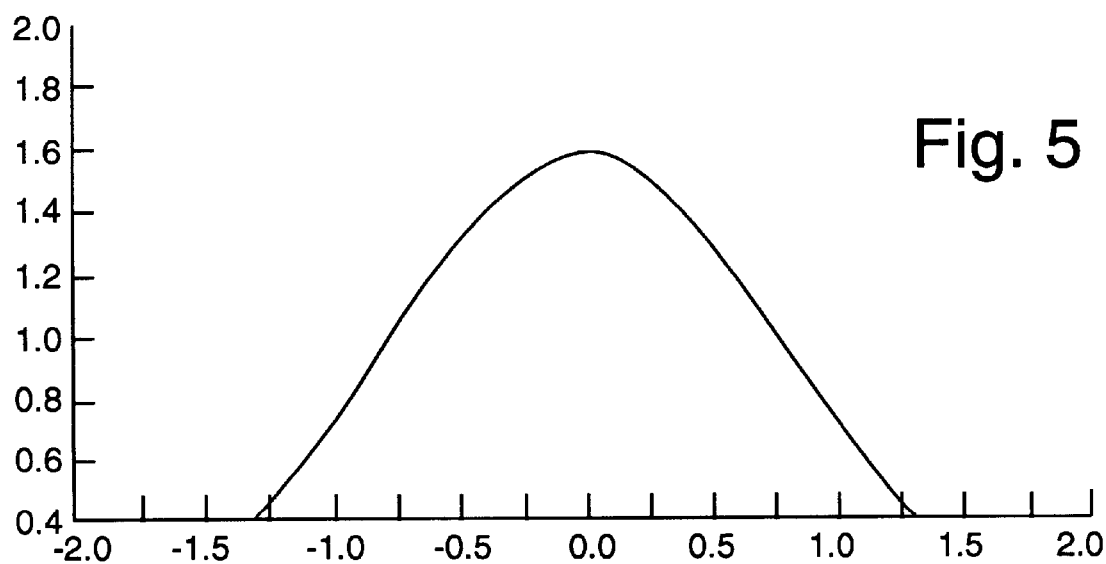
FIG. 5 is a graph of the light output distribution that occurs for the model shown in FIG. 4.

FIG. 4 represents a cross sectional model of an arc lamp and diffuse reflector of PT. Given the geometries shown in FIG. 4, a computer estimated the light distribution resulting from that geometry would have the distribution represented by FIG. 5.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A high intensity lamp system, comprising:

a long-arc lamp with a thin cylinder shape and having an electrode at each end;

a liquid coolant in which the long-arc lamp is disposed; and a diffuse reflector having a bulk material of polytetrafluorethylene (PTFE) having a pigment of titanium dioxide with a reflectivity exceeding 99% and shaped to partially surround both the long-arc lamp and the liquid-coolant, wherein any light emitted by the long-arc lamp is concentrated in one general direction.

2. The system of claim 1, further comprising:

cooling and purification circulation means for removing heat from the liquid coolant and for cleansing said liquid coolant.

3. The system of claim 2, wherein:

the cooling and purification circulation means includes a filter to clean out particles, a de-ionizer to remove ions and a biological sterilization means.

4. The system of claim 3, wherein:

said biological sterilization means includes an ultraviolet source positioned to irradiate a portion of said liquid coolant.

5. The system of claim 3, wherein:

said de-ionizer includes activated charcoal for reducing the conductivity of said liquid coolant to less than twelve megohms per centimeter.

6. The system of claim 4, wherein:
the cooling and purification circulation means further includes pumping means for continuous circulating of a portion of said liquid coolant through the diffuse reflector.

7. A method for a diffuse reflection of light in close proximity to a high-intensity lamp, the method comprising the steps of:
positioning a high-intensity lamp in a bath of water that is at least partially contained by a diffuse reflector comprising a bulk material of polytetrafluorethylene (PTFE) with a reflectivity exceeding 99%;
circulating said bath of water to remove heat from said high-intensity lamp; and
continuously filtering out particles, de-ionizing and biologically sterilizing said bath of water even during periods of non-operation of said high-intensity lamp, wherein the generation of any dark matter that could reduce an overall reflectivity of said diffuse reflector and cause a catastrophic heat spot runaway in said diffuse reflector is avoided.

8. The method of claim 7, wherein:
the step of positioning includes using an electric arc-type high-intensity lamp in a hollowed-out cylindrical trench reflector in said bulk material of polytetrafluorethylene (PTFE) with a white pigment of titanium dioxide; and
said continuous biologically sterilizing of said bath of water includes the use of an ultraviolet light to irradiate portions of said bath of water.

9. The method of claim 7, wherein:
the step of positioning includes using an electric arc-type high-intensity lamp in a hollowed-out cylindrical trench reflector in said bulk material of polytetrafluorethylene (PTFE) with a white pigment of titanium dioxide; and
said continuous de-ionizing of said bath of water includes the use of activated charcoal for reducing the conductivity of said bath of water to less than twelve megohms per centimeter.

10. A lamp system, comprising:
a plurality of high intensity lamps positioned in spaced relation,
each of said plurality of lamps comprising a long-arc lamp with a thin cylindrical shape and having electrodes operatively connected thereto,
cooling means for each of said plurality of lamps, and
a diffuse reflector for each of said plurality of lamps positioned with respect to each of said lamps such that light emitted thereform is concentrated in one direction.

11. The lamp system of claim 10 wherein each said diffuse reflector includes a quantity of bulk material composed of polytetrafluorethylene with a pigment of titanium dioxide.

12. The lamp system of claim 11, wherein each said diffuse reflector is shaped to partially surround both a lamp and cooling means for the lamp.

13. The lamp system of claim 10, wherein said cooling means includes a hollow member within which a lamp is positioned, and said hollow member is connected to means for at least circulating coolant about said lamp.

14. The lamp system of claim 10, additionally including means operatively connected to said cooling means to filter, deionize, and biological sterilize coolant for said plurality of lamps.

15. The lamp system of claim 10, wherein said plurality of lamps consists of two lamps spaced from each other, and wherein each diffuse reflector is constructed to direct light from one of said lamps to an area located between said spaced lamps.

16. The lamp system of claim 10, wherein each of said plurality of lamps has an electrode at each end thereof.

17. The lamp system of claim 10, wherein said cooling means includes a liquid coolant, and additionally including means operatively connected to said cooling means for at least biologically cleansing said liquid coolant by one of the group consisting of ultraviolet light, nuclear radiation, chemical treatment, and boiling.

18. The lamp system of claim 10, wherein said cooling means includes a liquid coolant, and additionally including means to filter said liquid coolant, said means to filter said coolant being capable of filtering out particles as small as one micron.

19. The lamp system of claim 10, wherein said cooling means includes a liquid coolant, and additionally including means for deionization/sterilization of said liquid coolant.

20. The lamp system of claim 10, wherein said lamps are positioned in said diffuse reflectors and said diffuse reflectors are constructed to concentrate light emitted from said plurality of lamps along a longitudinally extending line.

* * * * *